United States Patent Office 2,858,287
Patented Oct. 28, 1958

2,858,287

SULFUR-CURABLE POLYALKYLENEETHER POLYURETHANE ADHESIVE COMPOSITIONS

Charles A. Young, Wilmington, Del., assignor to E. I. du Pont de Nemours and Company, Wilmington, Del., a corporation of Delaware No Drawing. Application November 8, 1956
Serial No. 621,037

7 Claims. (Cl. 260—24)

This invention relates to an adhesive composition, and more particularly to an adhesive composition which is useful as a cement for adhering a sulfur-curable polyurethane polymer to itself in the manufacture of tires.

Sulfur-curable polyurethane polymers, and more particularly those prepared from a polytetramethyleneether glycol, have exhibited outstanding properties, such as abrasion resistance, and are, therefore, particularly suitable for tires. There are certain disadvantages, however, when these sulfur-curable polymers are used as tread stocks in the manufacture of tires, due to the present-day techniques for producing tires which involve the application of a tread stock to a drum-built carcass. When using these techniques, the two ends of a tread stock are either spliced on the building drum or spliced to form a band which is spun onto the drum. In either case, the adhesion between the spliced ends of the sulfur-curable polymer must be sufficiently good so that when the tire is expanded into the tire mold, the spliced ends will not part. In addition, when the tire is cured in the mold, the adhesion between the spliced ends must be as strong as the rest of the tread. The adhesive compositions which have been used heretofore have not proved adequate as a splice cement for sulfur-curable polyurethane polymers.

It is an object of the present invention to provide a new adhesive composition. A further object is to provide an adhesive composition which is useful as a splice cement for sulfur-curable polymers. A still further object is to provide an adhesive composition which is useful as a splice cement and which may be used in tire building procedures to adhere a sulfur-curable polyalkyleneether polyurethane polymer to itself and which, after curing, is as strong as the cured sulfur-curable polymer. Other objects will appear hereinafter.

These and other objects of the following invention are accomplished by the novel adhesive compositions comprising (a) about 100 parts by weight of a sulfur-curable polyalkyleneether polyurethane polymer, (b) from about 15 to 40 parts by weight of a reinforcing agent selected from the group consisting of reinforcing carbon black and flame silica, (c) from about 0.5 to 3.0 parts by weight of sulfur, (d) from about 1.0 to 5.0 parts by weight of 2,2'-dithiobisbenzothiazole, (e) from about 0.05 to 0.5 part by weight of a zinc halide selected from the group consisting of zinc chloride, zinc bromide and zinc iodide, (f) from about 25 to 75 parts by weight of a rosin ester which melts below about 60° C., and (g) from about 600 to 2000 parts by weight of an inert, volatile, organic solvent.

The adhesive compositions of the present invention may be prepared by several general procedures; however, in general, the compositions may be prepared by first incorporating the various ingredients into the sulfur-curable polyalkyleneether polyurethane polymer on a rubber roll mill and then cutting the polymer into smaller pieces and agitating it with the rosin ester in an inert, volatile, organic solvent until a homogeneous mass is obtained. Another convenient method is the conventional procedure for making rubber cements, namely, slow tumbling of the various ingredients in a closed container.

The sulfur-curable polyalkyleneether polyurethane polymers which are used in the adhesive compositions of the present invention are polymers which are prepared from a polyalkyleneether glycol having a molecular weight of at least about 750, an organic diisocyanate, and, if desired, a chain-extending agent such as a monomeric glycol. For purposes of the present invention, a polytetramethyleneether glycol, which may be prepared by the polymerization of tetrahydrofuran, is preferred. These polymers are more particularly described in U. S. Patent 2,808,391. These polymers are characterized in that they contain urethane linkages and in order that they be sulfur-curable they have side chains containing an aliphatic

group with the remaining valences on the carbon atoms of said group being satisfied by monovalent substituents. The process for the preparation of these polymers may be carried out by several general procedures. Thus, the polyalkyleneether glycol may be reacted with a molar excess of an organic diisocyanate, followed by a chain-extension step with a non-polymeric glycol having a side chain containing an aliphatic C=C group. Another method which may be used is to react the non-polymeric glycol with a molar excess of an organic diisocyanate and then react the resulting isocyanate-terminated product with the polytetramethyleneether glycol. The polyalkyleneether glycol which is used to prepare these sulfur-curable polymers should have a molecular weight of at least about 750; however, it may be as high as about 10,000. A preferred molecular weight range is from 750 to 2500. It is to be understood that other polymeric glycols, such as polyalkyleneether-thioether glycols, polyalkylene-aryleneether glycols and polyalkylene-aryleneether-thioether glycols, may be used to prepare the sulfur-curable polyurethane polymers for use in these adhesive compositions.

Any of a wide variety of organic diisocyanates may be used to prepare these polyurethane polymers; however, toluene-2,4-diisocyanate is preferred. Other representative diisocyanates include m-phenylenediisocyanate, 4-chloro-1,3-phenylenediisocyanate, 4,4' - biphenylenediisocyanate, 1,5 - naphthylenediisocyanate, 1,4 - tetramethylenediisocyanate, 1,6 - hexamethylenediisocyanate, 1,10 - decamethylenediisocyanate, 1,4 - cyclohexylenediisocyanate, 4,4' - methylene - bis - (cyclohexylisocyanate) and 1,5-tetrahydronaphthylenediisocyanate.

It is desirable and preferred that the side chain containing an aliphatic C=C group be introduced into the polyurethane polymers by means of the non-polymeric glycol reactant. These side chains serve as sulfur-curable sites and it is desirable to have at least one of these curing sites for every 8000 units of molecular weight of polymer. The non-polymeric glycols which may be used to prepare these sulfur-curable polyurethane polymers include compounds such as 4-methyl-3-cyclohexene-1,1-dimethanol, 3-cyclohexene-1,1-dimethanol, 3-allyloxy-1,5-pentanediol, 3-(allyloxy)-1,2-propanediol, 2 - [(allyloxy)methyl]-2-methyl-1,3-propanediol, 3 - (2-methylallyloxy)-1,2-propanediol, 2-[(allyloxy)ethyl]-1,3-propanediol, 2-[(3-methylallyloxy)methyl]-2-methyl-1,3-propanediol, 2-[(allyloxy)methyl]-1,3-propanediol, and 3-(4-allyl-2-methoxyphenoxy-1,2-propanediol.

The reinforcing agents which are used in the novel adhesive compositions of the present invention are flame silica or carbon black. The carbon black should be of the reinforcing type. This includes high abrasion furnace black and channel blacks. Generally the preferred types have a surface area of 60 to 240 square meters per gram based on nitrogen absorption. Flame silicas are quite different from the other silicas used in the rubber field in that they are hydrophobic and are in the form of very small spheres. These silicas are described in "India Rubber World," volume 129, page 481 (1954). The adhesive compositions of the present invention should contain from about 15 to 40 parts by weight of these reinforcing agents and it is to be understood that mixtures of these agents may be used. The preferred amount of reinforcing agent is 25 to 35 parts by weight per 100 parts of polymer. When using less than about 15 parts by weight, an adequate reinforcement is not obtained and this results in failure of bond. On the other hand, more than about 40 parts by weight dilutes the elastomer too much.

The rosin ester is used in the novel adhesion compositions of the present invention principally to provide tack to the composition after the solvent has evaporated. The rosin ester should melt below about 60° C. to be effective and it is to be understood that either rosin or hydrogenated rosin may be used. The rosin esters which are particularly useful in the process of the present invention are those esters which are derived from the lower aliphatic alcohols or glycols, such as methanol, ethanol, propanol, isopropanol, ethylene glycol, diethylene glycol, triethylene glycol, and propylene glycol. It is to be understood that mixtures of these rosin esters may be used in these adhesive compositions. The amount of rosin ester which is used should range from about 25 to 75 parts by weight per 100 parts of sulfur-curable polyurethane polymer in order to impart sufficient tack to the adhesive composition. The preferred amount of rosin ester to be used is from about 45 to 50 parts per 100 parts of polymer.

The sulfur is used as a vulcanizing or curing agent. For purposes of the present invention, from about 0.5 to 3.0 parts of sulfur per 100 parts of sulfur-curable polyurethane polymer should be used, with a preferred range to 4.0 parts per 100 parts of polymer.

The compound 2,2'-dithiobisbenzothiazole is used as a vulcanization accelerator and for purposes of the present invention, from about 1.0 to 5.0 parts by weight of this compound should be used per 100 parts of polyurethane polymer, with a preferred amount being from about 3.0 to 4.0 parts per 100 parts of polymer.

The zinc halide is used as a component of the adhesive composition as an accelerator and the amount which is used may vary from about 0.05 to 0.5 part per 100 parts of elastomer, with a preferred range of from about 0.1 to 0.3 part. The zinc halides which are useful are zinc chloride, zinc bromide, and zinc iodide.

The organic solvent which is used as a component of the adhesive compositions of the present invention must be one which is volatile and which is inert to the other ingredients of the composition. Volatile solvents which have a boiling range of from about 50 to 100° C. are particularly useful since they will evaporate within a reasonable time. It has been observed that solvents which boil at a lower temperature will evaporate too fast and cause condensation of moisture on the adhesive composition, while solvents boiling at temperatures above about 100° C. will tend to be retained in the adhesive and the adhesive does not then have the required tack. Unduly long drying times are then necessary for removal of the solvent. Representative solvents are methylethyl ketone, trichloroethylene, dioxane, tetrahydrofuran-dimethylformamide mixtures, and ethylacetate. For purposes of the present invention, methylethyl ketone is preferred. It is to be understood that mixtures of two or more solvents may be used.

The amount of solvent which is used may vary within wide limits depending on the desired viscosity of the composition; however, in general, it is desirable that an amount be used so as to provide about 600 to 2000 parts by weight of solvent per 100 parts of sulfur-curable polymer, with a preferred amount of about 800 to 1200 parts per 100 parts of polymer.

It is to be understood that the adhesive compositions of the present invention may contain other ingredients which are not critical to the composition. Thus, in the case of the zinc halide, this compound may be incorporated with the other components of the composition by adding it as a mixture or complex, which mixture or complex will generate the zinc halide when the composition is used as an adhesive. For many purposes, it is desirable to add the zinc halide in this manner since there is some difficulty encountered in using the zinc halides as such due to their acid nature and the fact that they are extremely hygroscopic. Particularly suitable zinc halide complexes include a 1:1 complex of zinc halide with a compound such as 2,2'-dithiobisbenzothiazole. Another similar type complex which may be used is a 2:1 complex of 2-mercaptobenzothiazole and the zinc halide. When the zinc halide is incorporated into the adhesive composition by means of these complexes, from about 0.175 to 1.75 parts of complex per 100 parts of sulfur-curable polyurethane polymer should be used so as to provide a sufficient amount of the zinc halide accelerator.

Other ingredients which may be incorporated with the adhesive compositions include additives, compounding ingredients, activating agents, and vulcanization accelerators, such as 2-mercaptobenzothiazole, carbon black, whiting, silica, etc. It has been found that the presence of an activating agent such as 2-mercaptobenzothiazole, when used in conjunction with the 2,2'-dithiobisbenzothiazole, tends to result in a decreased curing time. A convenient amount of 2-mercaptobenzothiazole which may be used is from about 1.0 to 2.0 parts per 100 parts of sulfur-curable polyurethane polymer.

When using the adhesive composition of the present invention to adhere various surfaces together, the surfaces may be coated with the composition and the solvent then permitted to evaporate. The time required for the solvent to evaporate will depend on the volatility of the solvent which is used in the composition. However, in general, from about 30 to 90 minutes is sufficient. The adhesive then remains as a coating having excellent tack and the surfaces are then pressed together. When doing this, hand pressure is usually sufficient; however, a press may be used if desired. The assembly is stitched to remove trapped air. After holding the surfaces together for about one minute, the bond is effected and the joined forms may then be processed.

The adhesive compositions of the present invention are particularly useful for adhering a sulfur-curable polyurethane elastomer to itself in the manufacture of tires. More particularly, the sulfur-curable polyurethane elastomers which may be adhered by the present composition are those which are described in U. S. Patent 2,808,391. When used with these polyurethane elastomers in the manufacture of tires, a section of the sulfur-curable polyurethane elastomer tread stock is skived and the skived edges are then coated with the adhesive composition and the solvent allowed to evaporate. The skived edges are then brought together to form a hoop and these edges are held for about one minute. The hoop is then allowed to stand for about 30 minutes, after which it is placed on a tire carcass on a building drum. The tire carcass is then bagged and shaped, during which operation the sulfur-curable polyurethane polymer tread stock is expanded about 30 to 40%. No separation of the splice occurs and on vulcanization, the adhesive composition, due to the presence of the curing agents contained therein, cures along with and becomes an integral part of the tire. The splice is found to be as strong as the rest of the tread stock.

The following examples will better illustrate the nature of the present invention; however, the invention is not intended to be limited to these examples. Parts are by weight unless otherwise indicated.

EXAMPLE 1

(A) *Preparation of polymer*

235 parts of toluene-2,4-diisocyanate is placed in a jacketed, glass-lined vessel and the atmosphere above it replaced with nitrogen. The agitation is started, 59.5 parts of 3-allyloxy-1,2-propanediol is added, the temperature is raised to 80° C., and agitation at 80° C. is continued for 3 hours. The mass is then cooled to 40–50° C. and 900 parts of polytetramethyleneether glycol of molecular weight 1000 is added. The mass is agitated while the temperature is raised to 80° C. and held there for about 2 hours while agitating to insure thorough mixing. The mass is then discharged into polyethylene-lined containers which are then closed and put in an oven at 80° C. and kept there for 3 days. There results a rubbery polyurethane polymer having allyl groups pendant on the elastomer chain.

(B) *Compounded polymer*

The following mixture is compounded on a rubber roll mill:

| | Parts |
|---|---|
| Polymer of 1(A) above | 100.0 |
| High abrasion furnace black | 30.0 |
| 2,2'-dithiobisbenzothiazole | 3.0 |
| 2-mercaptobenzothiazole | 1.0 |
| Zinc chloride/2,2'-dithiobisbenzothiazole complex | 0.35 |
| Sulfur | 1.0 |

It is then sheeted off the mill.

The zinc chloride/2,2'-dithiobisbenzothiazole complex is prepared by agitating 1 mol of zinc chloride with 1 mol of 2,2'-dithiobisbenzothiazole in boiling toluene under abrading conditions of agitation.

EXAMPLE 2

An adhesive composition is prepared by cutting 135 parts of the compounded polymer of 1(B) above into small pieces and adding it to 1668 parts of methylethyl ketone. There are then added to this mixture, 25 parts of the methyl ester of rosin and 25 parts of the triethylene glycol ester of hydrogenated rosin. This mixture is then tumbled slowly on a tumbling mill for 24 hours to produce a fluid composition having a total solids content of 10%.

The adhesive composition is tested as follows:

(a) A strip is cut from a sheet of the compounded polymer of 1(B). This strip is then cut in two, the cut being made at a 20° angle. The surfaces are coated with the composition and air-dried for 1 hour. The ends are then pressed together by hand and held for about 30 seconds. The strip is then pulled to 100% elongation and held in this position for 3 days. At the end of this time there is no evidence of separation at the splice.

(b) Two sheets, about 6 x 6 inches, of the compounded polymer of 1(B) are coated with the composition and air-dried for 1 hour. The sheets are then placed together, rolled to remove air bubbles, and cured by heating in a press at 140° C. for 1 hour. When the sheets are pulled in a direction perpendicular to the joint, at 25° C. and at 100° C., the joint holds and the polymer stock, itself, is torn.

(c) Two sheets of the compounded polymer of 1(B), about ½ inch thick, are adhered together as above and then a pellet 1 inch long and 0.75 inch in diameter is cut on a diagonal so that the splice runs across the pellet at an angle of about 37° from the vertical axis. The pellet is cured 1 hour at 140° C. It is then put on a Goodrich Flexometer and run for 20 minutes with a 150 pound per square inch load and a 3/16 inch stroke. (ASTM Standards, 1955, part 6, method D 623–52T.) The heat generated by this test raises the temperature of the pellet to 154° C. in the center but the splice remains intact.

EXAMPLE 3

(a) 135 parts of the compounded polymer of 1(B) is cut into small pieces and mixed with 1407 parts of methylethyl ketone and 75 parts of the triethylene glycol ester of hydrogenated rosin. The mixture is tumbled slowly until a homogeneous, fluid composition is obtained which contains 13% solids.

(b) A strip of the compounded polymer of 1(B) is cut on an angle and each side of the cut is coated with the adhesive composition prepared in (a) above. After air-drying for about an hour, the surfaces are put together and held under hand pressure for about 1 minute. The strip is then stretched to 200% of its original length and held for 24 hours. There is no evidence of separation. When the strip is cured by heating at 140° C. for 1 hour, the vulcanized splice is as strong as or stronger than the rest of the piece and does not separate when the strip is stretched to the breaking point.

When this adhesive composition is coated on a surface of the compounded polymer of 1(B) and the solvent allowed to vaporize, the surface has good tack even after several days.

EXAMPLE 4

135 parts of the compounded polymer of 1(B) is mixed with 25 parts of the methyl ester of hydrogenated rosin, 25 parts of the diethylene glycol ester of rosin and 741 parts of methylethyl ketone and tumbled slowly to form a syrupy homogeneous composition.

This composition is used to splice together two pieces of the compounded polymer of 1(B) by coating both sides, letting stand about an hour for the solvent to evaporate, and then putting the two surfaces together and holding under hand pressure for a minute. The splice does not separate when the piece is held in an extended position for a prolonged time. When cured at 140° C. for 1 hour, the splice does not separate when the strip is stretched to the breaking point.

A pellet cut as in Example 2 is subjected to the Goodrich Flexometer test with a 200 pound per square inch load and a 0.25 inch stroke until the pellet is destroyed. The failure does not occur in the splice.

EXAMPLE 5

(a) 135 parts of the compounded polymer of 1(B) is tumbled slowly with 25 parts of the methyl ester of hydrogenated rosin and 1288 parts of methylethyl ketone to produce a homogeneous adhesive composition.

(b) A compounded stock is prepared by milling on a rubber roll mill, 100 parts of the polymer of 1(A), 30 parts of high abrasion furnace black, 1 part of 2-mercaptobenzothiazole, 3.0 parts of 2,2'-dithiobisbenzothiazole, 0.35 part of zinc chloride/2,2'-dithiobisbenzothiazole complex, and 1.5 parts of sulfur. The stock is sheeted off the mill. Strips are cut from the sheet and then the strips are cut with a diagonal cut.

(c) The surfaces of the compounded stock prepared in (b) above are coated with the adhesive composition prepared in (a) above, air-dried for 10 minutes and pressed together by hand. One of the strips is extended to 200% of its original length and held in that position. After 24 hours there is no sign of separation at the splice. Another strip is cured for 1 hour at 140° C. On stretching to the break, the splice remains intact.

EXAMPLE 6

100 parts of the polymer of 1(A) is compounded on a rubber roll mill with 30 parts of flame silica, 1 part of 2-mercaptobenzothiazole, 4 parts of 2,2'-dithiobisbenzothiazole, 0.35 part of zinc chloride/2,2'-dithiobisbenzothiazole complex and 1 part of sulfur. The stock is sheeted off the mill and cut into small pieces which are added to a solution of 20 parts of the diethylene glycol ester of hydrogenated rosin and 30 parts of the methyl ester of hydrogenated rosin in 849 parts of methylethyl ketone. The mixture is tumbled for 20 hours to produce a fluid, homogeneous adhesive composition containing 18% solids.

Strips of the compounded polymer of 1(B) are cut on an angle and the cut surfaces coated with the adhesive composition prepared above. The surfaces are air-dried for a day and are still highly tacky. The surfaces are then put together and held under hand pressure for 1 minute. One strip is immediately stretched to twice its original length and clamped in that position. After 24 hours there is no sign of failure of the splice. Another strip is cured at 140° C. for 3 hours. The splice is equally as strong as the cured stock.

As many widely different embodiments of this invention may be made without departing from the spirit and scope thereof, it is to be understood that this invention is not limited to the specific embodiments thereof except as defined in the appended claims.

What is claimed is:

1. A novel adhesive composition comprising (a) about 100 parts by weight of a sulfur-curable polyalkyleneether polyurethane polymer prepared from a polyalkyleneether glycol having a molecular weight of at least about 750, an organic diisocyanate, and a monomeric glycol, said polyurethane polymer having side chains containing an aliphatic

group with the remaining valences on the carbon atoms of said group being satisfied by monovalent substituents, said side chains occurring at least once for every 8000 units of molecular weight of polymer, (b) from about 15 to 40 parts by weight of a reinforcing agent selected from the group consisting of reinforcing carbon black and flame silica, (c) from about 0.5 to 3.0 parts by weight of sulfur, (d) from about 1 to 5 parts by weight of 2,2'-dithiobisbenzothiazole, (e) from about 0.05 to 0.5 part by weight of a zinc halide selected from the group consisting of zinc chloride, zinc bromide and zinc iodide, (f) from about 25 to 75 parts by weight of a rosin ester which melts below about 60° C., said ester being prepared from a compound selected from the group consisting of lower aliphatic alcohols and lower aliphatic glycols, and (g) from about 600 to 2000 parts by weight of an inert, volatile, organic solvent.

2. A novel adhesive composition comprising (a) about 100 parts by weight of a sulfur-curable polyalkyleneether polyurethane polymer prepared from a polyalkyleneether glycol having a molecular weight of at least about 750, an organic diisocyanate, and a monomeric glycol, said polyurethane polymer having side chains containing an aliphatic

group with the remaining valences on the carbon atoms of said group being satisfied by monovalent substituents, said side chains occurring at least once for every 8000 units of molecular weight of polymer, (b) 30 parts by weight of high abrasion furnace black, (c) 1.0 part by weight of sulfur, (d) 3.0 parts by weight of 2,2'-dithiobisbenzothiazole, (e) 0.2 part by weight of zinc chloride, (f) 50 parts by weight of a rosin ester which melts below about 60° C., said ester being prepared from a compound selected from the group consisting of lower aliphatic alcohols and lower aliphatic glycols, and (g) 625 parts by weight of methylethyl ketone.

3. The novel adhesive composition of claim 2 wherein the sulfur-curable polyalkyleneether polyurethane polymer is prepared from a polytetramethyleneether glycol having a molecular weight of at least 750, an organic diisocyanate, and a non-polymeric glycol having a side chain which contains an aliphatic

group with the remaining valences on the carbon atoms of said group being satisfied by monovalent substituents.

4. The composition of claim 3 wherein the organic diisocyanate is toluene-2,4-diisocyanate and the non-polymeric glycol is 3-allyloxy-1,2-propanediol.

5. The novel adhesive composition of claim 2 wherein the zinc chloride is introduced into the composition as a zinc chloride/2,2'-dithiobisbenzothiazole complex.

6. A novel adhesive composition consisting essentially of (a) about 100 parts by weight of a sulfur-curable polyalkyleneether polyurethane polymer prepared from a polyalkyleneether glycol having a molecular weight of at least about 750, an organic diisocyanate, and a monomeric glycol, said polyurethane polymer having side chains containing an aliphatic

group with the remaining valences on the carbon atoms of said group being satisfied by monovalent substituents, said side chains occurring at least once for every 8000 units of molecular weight of polymer, (b) 30 parts of high abrasion furnace black, (c) 3.0 parts of 2,2'-dithiobisbenzothiazole, (d) 1.0 part of 2-mercaptobenzothiazole, (e) 1.0 part of sulfur, (f) 0.35 part of a zinc chloride/2,2'-dithiobisbenzothiazole complex, (g) 50 parts of the methyl ester of rosin, and (h) 625 parts of methylethyl ketone.

7. The composition of claim 6 wherein the sulfur-curable polyurethane polymer is prepared from a polytetramethyleneether glycol having a molecular weight of at least 750, toluene-2,4-diisocyanate and 3-allyloxy-1,2-propanediol.

No references cited.

UNITED STATES PATENT OFFICE
CERTIFICATE OF CORRECTION

Patent No. 2,858,287                                            October 28, 1958

Charles A. Young

It is hereby certified that error appears in the printed specification of the above numbered patent requiring correction and that the said Letters Patent should read as corrected below.

Column 3, line 40, strike out "to 4.0 parts per 100 parts of polymer." and insert instead -- of from about 1.0 to 1.5 parts of sulfur. --.

Signed and sealed this 10th day of February 1959.

(SEAL)
Attest:

KARL H. AXLINE
Attesting Officer

ROBERT C. WATSON
Commissioner of Patents